United States Patent [19]

Lo

[11] Patent Number: 4,493,472
[45] Date of Patent: Jan. 15, 1985

[54] MOULD USED FOR MAKING A RACKET FRAME

[76] Inventor: Kun N. Lo, No. 7-1, La. 246, Chung Hsan Rd., Sec. 3, Tan Tzu Hsiang, Taiwan

[21] Appl. No.: 416,401

[22] Filed: Sep. 9, 1982

[51] Int. Cl.³ .............................. B29C 1/06; B29C 1/14
[52] U.S. Cl. ...................................... 249/57; 249/122; 249/160
[58] Field of Search .......................... 249/57, 122, 160; 264/257, 137; 273/DIG. 7, 736, 73 C, 73 F

[56] References Cited

U.S. PATENT DOCUMENTS 3,483,055 12/1969 Eshbaugh ..................... 273/DIG. 7
3,993,308 11/1976 Jenks .............................. 273/DIG. 7
4,264,389 4/1981 Staub et al. ........................ 273/73 F Primary Examiner—Willard E. Hoag

[57] ABSTRACT

A mould used for making a racket frame comprises an upper mould piece, a lower mould piece and an intermediate mould piece which cooperate to form a cavity that imparts a racket frame shape with the parting line of the mould pieces lying apart from a plane X-X that passes through stringing holes which will be drilled in the frame formed in the mould, thereby avoiding the performing of the deflashing operation at the portion near the stringing holes and preventing the damage of the fiber reinforcement for the string at that portion.

2 Claims, 3 Drawing Figures

MOULD USED FOR MAKING A RACKET FRAME

BACKGROUND OF THE INVENTION

This invention relates to a mould used for making a racket frame particularly to one used for making a fiber reinforced racket frame.

There is a conventional racket frame mould which has an upper mould piece 1, a lower mould piece 2 and an intermediate mould piece 3 and of which the parting line 12 coincides the plane that will pass through the stringing holes drilled in the frame formed, as shown in FIG. 1. In case of moulding a fiber reinforced racket frame, it is found that the fibers exist at the portion 11 extend into the seam at the parting line 12, due to the moulding pressure, as the flash does. During the mechanically finishing operation, the extending fibers at the portion 11 which is adjacent to the stringing holes will be cut out together with the flash, such as by grinding, sanding etc. As the result, the fiber reinforcement for the string at the portion 11 are damaged, causing the frame to easily break when subject to an impact and the tension of the strings.

SUMMARY OF THE INVENTION

According to the invention a mould used for making a racket frame, of the type having an upper mould piece, a lower mould piece and an intermediate mould piece, is characterized in that the parting line of the mould pieces are made to lie apart from a plane that will pass through the stringing holes which will be drilled in the frame formed in the mould, thereby avoiding the performing of the deflashing operation at the portion near the stringing holes and preventing the damage of the fiber reforcement for the string at that portion.

Advantageously, the parting line of the mould pieces is arranged such that it is 2 mm apart from the plane that will pass through the stringing holes which will be drilled in the frame formed in the mould.

An object of the invention is to provide an improved mould by which a fiber reinforced racket frame can be moulded in an effectively reinforced manner.

This and other objects, features and advantages of the present invention will be more apparent in the following description of a preferred embodiment with reference to the accompanying drawings, in which:

DETAILED DESCRIPTION OF THE PREFERRED EMBODIMENT

Figure 3:
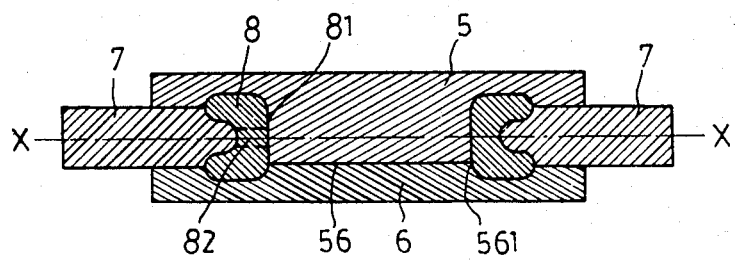
FIG. 3 is a section view taken along the line III—III in FIG. 2.
Figure 2:
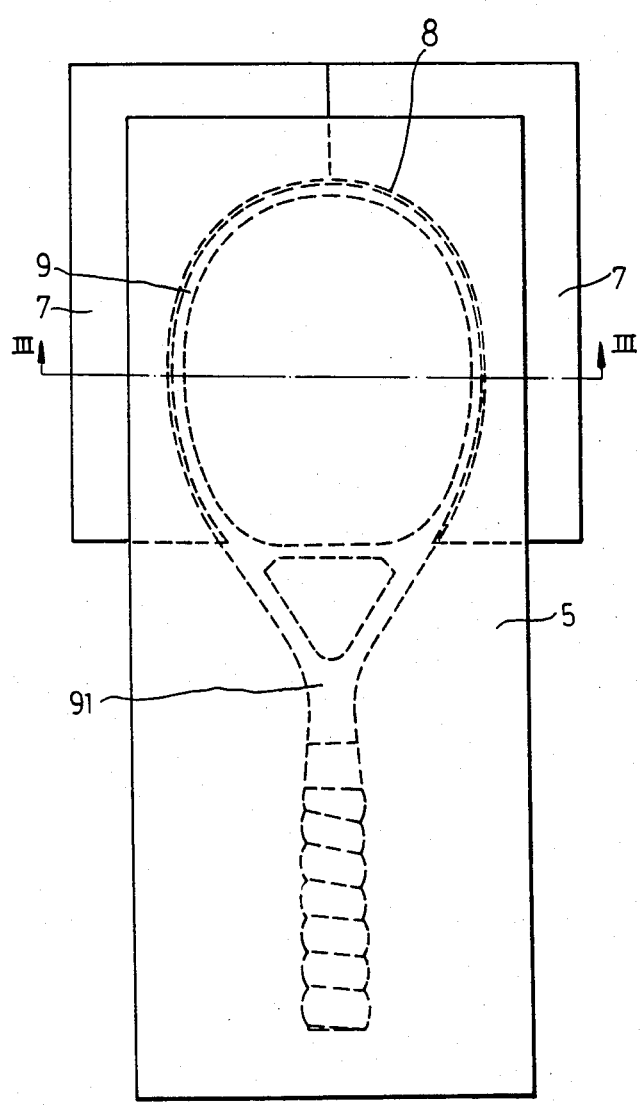
FIG. 2 is an elevation view of the mould constructed according to the invention.

In an illustration of the embodiment, there is a mould which is made up of an upper mould piece 5, a lower mould piece 6 and an intermediate mould piece 7 as shown in FIGS. 2 and 3. The upper mould piece 5, lower mould piece 6, and intermediate mould piece 7 cooperate to form a cavity 9 which will impart a shape corresponding to the ring portion of the racket frame 8. This cavity 9 has an extended portion 91 which will impart a shape corresponding to the throat portion and handle portion of the racket frame 8 and is confined by the upper and lower mould pieces 5 and 6.

The mould 4 has a parting line 56 lower than the plane passing the locations of the stringing holes 82 which will be drilled in the racket frame 8 that is formed in the cavity 9. This plane is represented by the line X—X, in FIG. 3, symetrically parting the section view as shown. Preferably, the parting line 56 is made to lie 2 mm apart from the line X—X.

When casting a fiber reinforced racket frame 8 in the mould 4, the flash and some of the reinforcing fiber 561 penetrate into the seam of the parting line 56 because of the moulding pressure. As is done in the conventional processing of the racket frame the flash would be removed during the finishing operation by mechanical action such as by grinding, sanding etc. At this condition some of the fibers 561 will be caused to break at the portion adjacent to the parting line 56.

As this portion is spaced apart from the line X—X the fiber reinforcement for the strings will not be affected by that deflashing operation.

Figure 1:
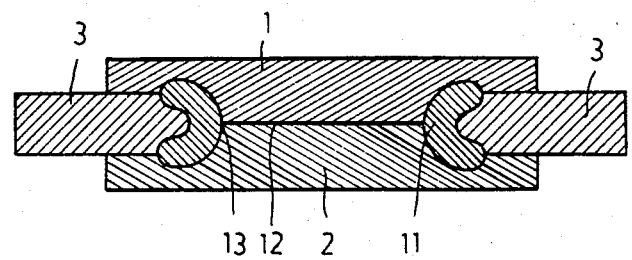
FIG. 1 is a section view of a mould in the prior art.

It must be noted that the mould 4 is constructed in such a manner that the cavity thereof should impart a flat face shape 81 to the inner peripheral surface of the ring portion of the racket frame 8 above the parting line 56 as shown in FIG. 3. If this cavity imparts a curved face shape as the conventional case which has a curve face 13 as illustrated in FIG. 1, such curved face may induce a difficulty when separating the mould pieces 5 and 6. This is because the curved face may engage with the upper mould piece 5. Therefore it should be aware that a proper shape of the mould cavity is necessary for the mould 4.

With the invention thus explained, it is apparent that obvious modifications and variations can be made without departing from the scope of the invention. It is therefore intended that the invention to be limited only as indicated in the appended claims.

What I claim is:

1. A racket frame mold for a racket frame having a looped head of generally U-shaped cross-section and round edges, upper, lower, inner and outer surfaces and a plurality of stringing holes therein; a throat section; and a shaft section, the racket frame mold comprising: an upper mold piece; a lower mold piece, the upper and lower mold pieces cooperating to form a space defining the upper, lower and inner surfaces of the looped head, the throat portion and the shaft portion of the racket frame; and an intermediate mold piece interjacent the upper and lower mold pieces for defining the outer surfaces of the looped head of the racket frame; a parting line between the upper and lower mold pieces being located intermediate the lower side of the stringing hole and the lower surface of the looped head of the racket frame.

2. A racket frame mold as claimed in claim 4 wherein the parting line is located 2 millimeters below the axis of the stringing hole of the racket frame.

* * * * *